United States Patent
Bates et al.

(10) Patent No.: US 6,804,704 B1
(45) Date of Patent: Oct. 12, 2004

(54) SYSTEM FOR COLLECTING AND STORING EMAIL ADDRESSES WITH ASSOCIATED DESCRIPTORS IN A BOOKMARK LIST IN ASSOCIATION WITH NETWORK ADDRESSES OF ELECTRONIC DOCUMENTS USING A BROWSER PROGRAM

(75) Inventors: Cary Lee Bates, Rochester, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 09/641,362

(22) Filed: Aug. 18, 2000

(51) Int. Cl.[7] ............................................... G06F 15/16
(52) U.S. Cl. ....................... 709/217; 709/203; 709/206; 709/219; 709/224
(58) Field of Search ................................ 709/203, 206, 709/217, 219, 724

(56) References Cited

U.S. PATENT DOCUMENTS

| | | | | |
|---|---|---|---|---|
| 5,924,105 A | * | 7/1999 | Punch et al. ................ | 715/513 |
| 6,012,102 A | * | 1/2000 | Shachar ......................... | 710/5 |
| 6,100,890 A | * | 8/2000 | Bates et al. .................. | 345/826 |
| 6,256,622 B1 | * | 7/2001 | Howard et al. ................ | 707/3 |
| 6,275,490 B1 | * | 8/2001 | Mattaway et al. .......... | 370/352 |
| 6,278,992 B1 | * | 8/2001 | Curtis et al. .................... | 707/3 |
| 6,311,278 B1 | * | 10/2001 | Raanan et al. .............. | 713/201 |
| 6,344,851 B1 | * | 2/2002 | Roberts et al. ............. | 345/418 |
| 6,400,810 B1 | * | 6/2002 | Skladman et al. ........ | 379/93.24 |
| 6,401,118 B1 | * | 6/2002 | Thomas ...................... | 709/224 |
| 6,446,076 B1 | * | 9/2002 | Burkey et al. .............. | 707/102 |
| 6,574,625 B1 | * | 6/2003 | Bates et al. ..................... | 707/5 |
| 6,585,776 B1 | * | 7/2003 | Bates et al. .............. | 715/501.1 |
| 6,606,644 B1 | * | 8/2003 | Ford et al. .................. | 709/203 |
| 6,618,748 B1 | * | 9/2003 | Bates et al. ................. | 709/206 |
| 6,631,400 B1 | * | 10/2003 | DiStefano, III ............. | 709/206 |

* cited by examiner

*Primary Examiner*—Nabil Elhady
(74) *Attorney, Agent, or Firm*—Moser, Patterson & Sheridan, LLP

(57) ABSTRACT

A method, article of manufacture and apparatus for executing a browser program to collect and store electronic mail addresses is provided. More particularly, the browser program, when executed, accesses an electronic document containing at least one electronic mail address. The electronic document is then parsed to identify the electronic mail address or addresses, and the electronic mail address or addresses are stored.

48 Claims, 5 Drawing Sheets

SYSTEM FOR COLLECTING AND STORING EMAIL ADDRESSES WITH ASSOCIATED DESCRIPTORS IN A BOOKMARK LIST IN ASSOCIATION WITH NETWORK ADDRESSES OF ELECTRONIC DOCUMENTS USING A BROWSER PROGRAM

BACKGROUND OF THE INVENTION

1. Field of the Invention

The invention relates to information processing systems. More particularly, the invention relates to a method, article of manufacture and apparatus for operating a browser program configured to process electronic mail addresses.

2. Background of the Related Art

Browsers and electronic mail have become important and widely used in today's computing environment. In general, a browser, or browser program, translates information into a form that is accessible to a computer user, such as graphics, text, sound, etc., or a combination thereof (i.e. multimedia). One application of a browser is to facilitate communication between linked computer system resources, such as computer networks, including both local area networks (LANs) and wide area networks (WANs) such as the Internet.

For example, Internet browsers (e.g., Netscape's Navigator and Windows' Explorer) provide a user of the browser with access to files, or documents, on the Internet and the World Wide Web (WWW, or the Web), which is the Internet's multimedia information retrieval system. Using an Internet browser, a user's computer (i.e. the client) communicates with a host computer (i.e. the server) connected to the client via the Internet and having a specific Internet address. The client transacts with the server (or servers) using Hypertext Transfer Protocol (HTTP), which is a known application protocol providing users access to files or documents (e.g. graphics, text, sound, etc.) using a standard page description language known as Hypertext Markup Language (HTML). HTML provides basic document formatting for document retrieval and allows specification of "links" within a file to other servers and files, allowing a user to navigate therebetween. An Internet path to a server is identified by a Uniform Resource Locator (URL) having a special syntax for defining a network connection.

Browsers often contain bookmarks, also called bookmark lists, that allow a user to conveniently store and retrieve information useful in locating and retrieving certain information using the browser. For example, an Internet browser allows a user to access network addresses and server files (i.e., Web "pages") using URLs. Most commercially available Internet browsers provide a bookmark list in which a user can store network addresses (URLs) for future retrieval.

In addition to browsers, electronic mail (e-mail) has become increasingly important and useful. Generally, e-mail is electronic messaging between linked computers, including computers connected via a network such as the Internet. An e-mail address specifies a destination, or a path to a destination, for an electronic message.

Frequently, the information or files accessed using a browser contain one or more e-mail addresses associated in some way with the accessed information. For example, in the Internet context, a Web page frequently contains e-mail addresses associated in various ways with that Web page. In some cases the Web page may include the e-mail address of the Web page owner (including a Web page manager), the e-mail address of a person to contact for correspondence relating to the Web page, etc.

Often, a user who accesses, or browses, Web pages on the Internet later desires to access e-mail addresses contained within certain previously browsed, or accessed, Web pages. However, while prior art browsers may provide bookmark lists that allow a user to access Web pages, they do not facilitate retrieval of e-mail addresses that may be contained within the Web pages. Therefore, a user must locate the Web page in which the e-mail address is contained, and/or browse previously browsed Web pages in order to find desired e-mail addresses.

Therefore, there is a need for a method, article of manufacture and apparatus for collecting electronic mail addresses using a browser program.

SUMMARY OF THE INVENTION

A method, article of manufacture and apparatus for collecting electronic mail addresses using a browser program is provided. In one embodiment, a method is provided for collecting electronic mail addresses, comprising executing a browser program to access an electronic document having a network address and containing at least one electronic mail address, parsing the electronic document to identify the at least one electronic mail address, and storing the at least one electronic mail address.

Another embodiment provides a computer-readable medium having instructions or programs which, when executed by a processor, cause the processor to perform a method, comprising executing a browser program to access an electronic document having a network address and containing at least one electronic mail address, parsing the electronic document to identify the at least one electronic mail address, and storing the at least one electronic mail address.

Still another embodiment provides an apparatus for collecting electronic mail addresses, comprising a memory for storing a browser program, a processing unit coupled to the memory, and a network containing at least one electronic document having a network address and containing at least one electronic mail address. The processing unit is configured to execute the browser program to cause the browser program to access an electronic document of the at least one electronic documents, parse the electronic document to identify the at least one electronic mail address, and store the at least one electronic mail address.

BRIEF DESCRIPTION OF THE DRAWINGS

A more particular description of embodiments of the invention, briefly summarized above, may be had by reference to the illustrations in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments of the present invention generally relate to a browser program configured to collect electronic mail (e-mail) addresses.

As will be described in detail below, aspects of specific embodiments pertain to steps implementable on computer systems. In alternative embodiments, the invention may be implemented as a computer program-product for use with a computer system. The programs defining the functions of specific embodiments can be delivered to a computer via a variety of signal-bearing media, which include, but are not limited to: (i) information permanently stored on non-writable storage media (e.g., read only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. Such signal-bearing media, when carrying computer-readable instructions that direct the functions of the present invention, represent alternative embodiments of the present invention.

Figure 1:
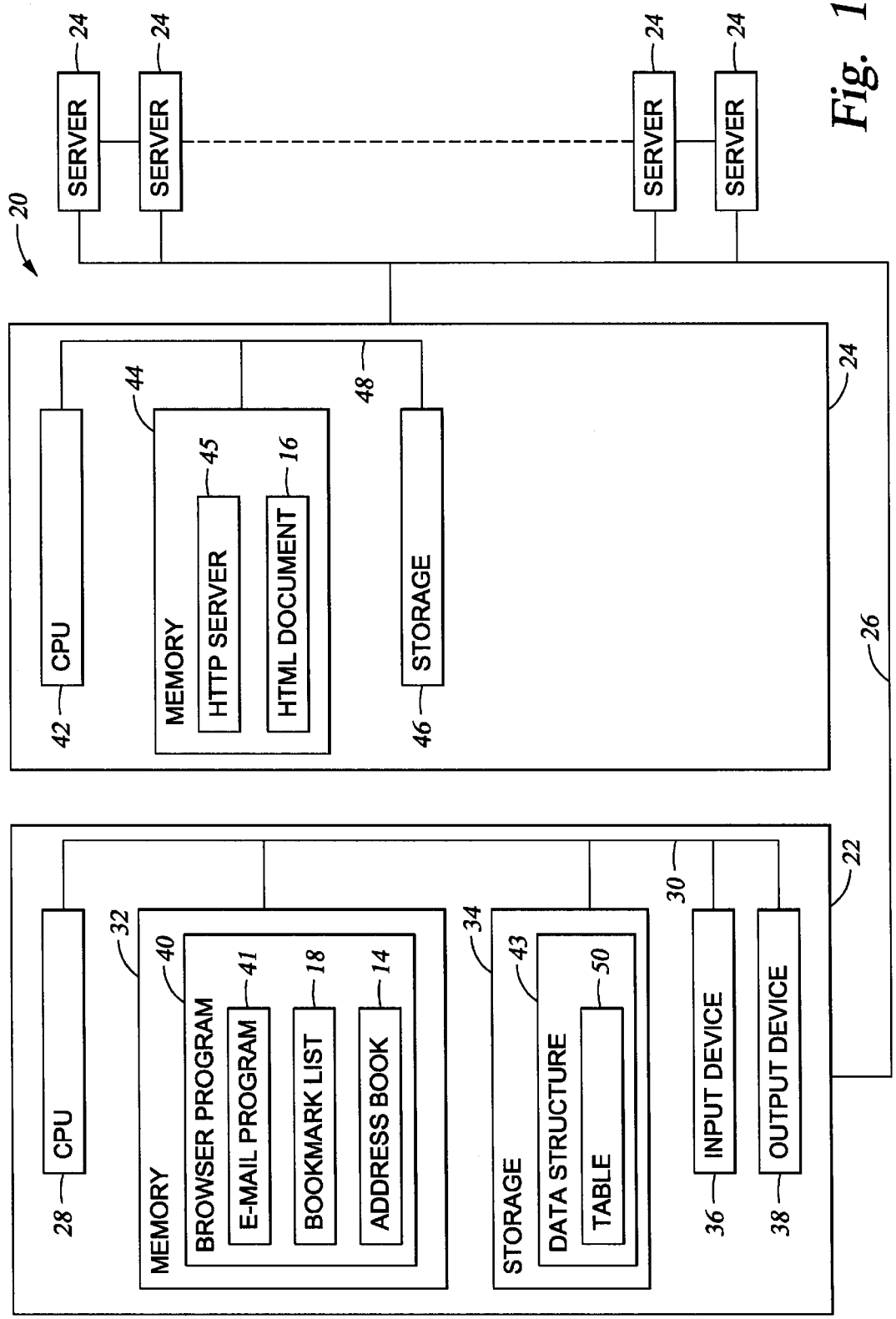
FIG. 1 depicts a block diagram showing a client computer and a connected server computer.

FIG. 1 depicts a data processing system 20 in which embodiments of the invention may be implemented. Although a specific hardware configuration is shown for data processing system 20, embodiments of the invention can apply to any hardware configuration that allows browsing, regardless of whether the computer system is a complicated, multi-user computing apparatus, a single-user workstation or a network appliance that does not have non-volatile storage of its own.

In general, the data processing system 20 includes a client computer 22 and at least one server computer 24 (five such servers are shown). The client computer 22 and the server computer 24 may be components of the same computer system or may be separate components connected via a network 26, such as the Internet.

Each server computer 24 generally comprises a CPU 42, memory 44 and storage 46 coupled to each other by a bus 48. The memory 44 is random access memory sufficiently large to hold the necessary programming and data structure(s) that are located on the server computer 24 according to a network information address (e.g., a Uniform Resource Locator, or URL). As shown, the memory 44 includes a hypertext transfer protocol (HTTP) server processor 45 adapted to service requests from the client computer 22 regarding Hypertext Markup Language (HTML) documents specified by URLs. As shown, the memory 44 also includes an electronic document such as an HTML document 16. It should be understood that the protocols and programming languages described herein are merely illustrative. The programming and any data structures may be accessed and executed by the CPU 42 as needed. The storage 46 is provided for long-term storage of implementation code and data needed during operation.

The client computer 22 includes a Central Processing Unit (CPU) 28 connected via a bus 30 to memory 32, storage 34, input device 36 and output device 38. The input device can be any device to give input to the client computer 22. For example, a keyboard, keypad, light pen, touch screen, button, mouse, trackball or speech recognition unit could be used. The output device 38 is preferably any conventional display screen and, although shown separately from input device 36, the output device 38 and input device 36 could be combined. For example, a display screen with an integrated touch screen, a display with an integrated keyboard, or a speech recognition unit combined with a text speech converter could be used.

In one embodiment, storage 34 is a DASD (Direct Access Storage Device), although it could be other storage such as floppy disk drives, tape drives, removable memory cards or optical storage. Additionally, Memory 32 and storage 34 could be part of one virtual address space spanning multiple primary and secondary storage devices. As shown, the storage 34 contains at least one data structure 43, such as a relational database, containing at least one database table 50. However, the storage 34 may contain numerous data structures.

Memory 32 is preferably a random access memory sufficiently large to hold the necessary programming and any data structure(s). While memory 32 is shown as a single entity, it should be understood that memory 32 may in fact comprise a plurality of modules, and that the memory may exist at multiple levels, from high speed registers and catches to lower speed but larger DRAM chips.

In the data processing system 20 shown, the memory 32 contains a browser program 40 that, when executed on the CPU 28, provides support for navigating between various servers 24 and locating addresses at one or more of the servers 24. However, it should be understood that in other embodiments of the invention, the browser program 40 could comprise various software that translates information into a form that is accessible to a computer user, such as graphics, text, sound, etc., or a combination thereof (i.e. multimedia).

As shown, the browser program 40 comprises an e-mail program 41. However, the e-mail program 41 could be separate from the browser program 40. The e-mail program 41 allows a user to send and receive e-mail messages using the network 26.

In one embodiment of the invention, the browser program 40 also comprises an address book 14. The address book 14 provides a user with a list of collected e-mail addresses.

In one embodiment, the browser program 40 includes a bookmark list 18 that allows a user of the client computer 22 to store network addresses (URLs), or bookmark list entries, for future retrieval. Various information for each bookmark entry may be stored in table 50. Each bookmark list entry contains the title of the Web page and the associated URL for that entry. A user can navigate to a particular URL by choosing the corresponding title through the browser program 40.

The bookmark list 18 also contains a list, or group, of e-mail addresses associated with each bookmark list entry. When a Web page is added to the bookmark list 18, the browser program 40 may scan or parse the Web page for e-mail addresses and collect email addresses contained in the Web page. The e-mail addresses are then stored in table 50 or elsewhere in the storage 34. In other embodiments of the invention, however, the e-mail addresses could be stored in other ways and by other means, including being stored non-electronically, such as by being printed using a printer.

In one embodiment of the invention, the browser program 40 automatically updates the list of e-mail addresses associated with a bookmarked Web page whenever that Web page is again accessed by a user. Furthermore, a user is provided with the option to "refresh" the e-mail addresses associated with a particular Web page, which causes the browser program 40 to update the list of e-mail addresses associated with a specified bookmarked Web page without a user having to access that Web page.

In one embodiment of the invention, an option is provided to a user to cause the browser program 40 to collect e-mail addresses not only from the bookmarked Web page, but also from all Web pages linked to a bookmarked Web page (i.e., pointed to by a pointer in the bookmarked Web page). Thus, a user may cause the browser program 40 to collect e-mail addresses from all Web pages linked to a bookmarked Web page without the user necessarily accessing each or any of the linked Web pages.

To facilitate convenient and logical retrieval by a user at a later time, the e-mail addresses may be stored so as to be grouped according to the Web page from which they were collected, or they may grouped in some other manner. However, other embodiments are contemplated wherein e-mail addresses are collected by a browser program 40 and stored without being grouped.

Figure 2:
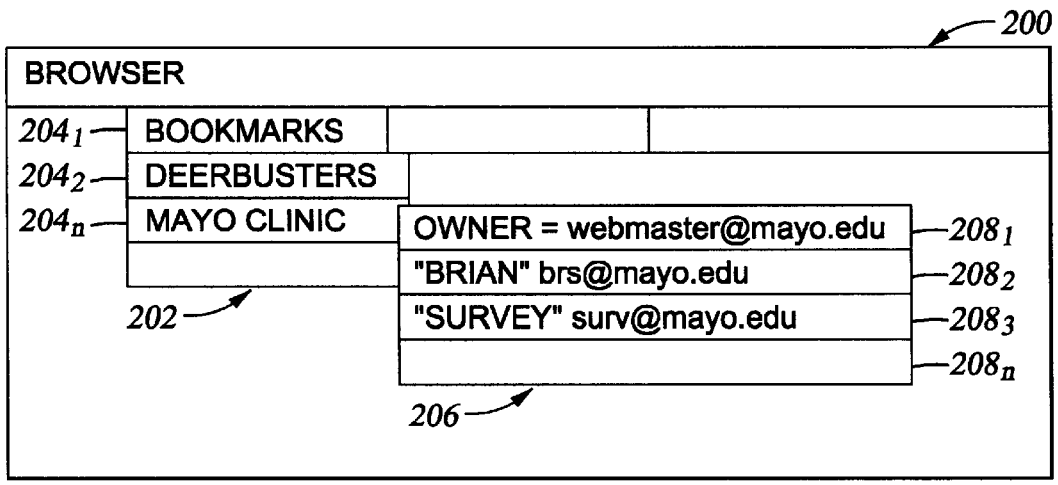
FIG. 2 depicts a graphical user interface for the browser of FIG. 1, displaying a bookmark list menu.

FIG. 2 depicts a graphical user interface 200 for the browser program 40 of FIG. 1, displaying a bookmark list menu 202. The bookmark list menu 202 allows a user to select an entry from a list of Web page titles ($204_1$–$204_n$) in order to facilitate navigation to the Web page having the selected title. In addition, an e-mail address menu 206 displays a listing of e-mail addresses collected by the browser program 40 from the Web page associated with the selected Web page title. For example, FIG. 2 displays a list of e-mail addresses ($208_1$–$208_n$) collected from the Web page entitled "Mayo Clinic" (Web page title $204_2$).

In addition to displaying e-mail addresses, the e-mail address menu 206 displays text or other descriptor associated in some way with each e-mail address. Illustratively, the e-mail address menu 206 displays the owner's email address with the text "Owner:" preceding the owner's e-mail address, as shown in e-mail address $208_1$, for a user's information.

In one embodiment, HTML tags are utilized to provide the text. For example, Web page data files located on the server computer 24 contain tags, in Hypertext Markup Language (HTML), that instruct the browser on how to process the content of the Web page. These tags can be used as the basis for displayed text preceding an e-mail address. One such tag typically presented in a Web page data file identifies the owner of the Web page.

In addition, other e-mail addresses in the e-mail address list may be preceded by the text that precedes the e-mail address as it appears on the Web page from which it was collected. For example, often the name of an individual precedes his or her email address on a Web page. This name may be displayed in quotes in the e-mail address appearing in the e-mail address list, such as in e-mail address $208_2$, wherein the name "Brian" is displayed before the associated e-mail address.

Other e-mail addresses in Web pages are preceded by text that identifies the use or intended recipient of a message sent to the e-mail address. For example, e-mail address $208_3$ contains the word "survey" (as a descriptor) in quotes preceding the e-mail address that likely may be used to respond to a survey related to the Web page from which that e-mail address was collected. However, the descriptor may appear in the Web page without quotes. In addition, the descriptor may be more than a single word. For example, a Web page may contain a phrase reading, "for questions, please contact Matthew at" preceding an e-mail address. The entire phrase may be stored and displayed as the descriptor.

In one embodiment of the invention, the browser program 40 also allows a user to edit the text to better match the e-mail address that it precedes. Additionally, the browser program 40 allows a user to add e-mail addresses of a user's choosing or to delete e-mail addresses from the list of e-mail addresses associated with a particular Web page.

By collecting the e-mail addresses contained within a Web page, the browser program 40 allows a user to use the e-mail addresses without having to revisit, or re-access, the corresponding Web page. In addition, a user is provided with access to collected e-mail addresses corresponding to a Web page even in the event that the Web page is presently inaccessible to a user.

In one embodiment of the invention, the browser program 40 enables a user to work "backwards" by selecting a collected e-mail address displayed in e-mail address menu 206 in order to access the URL of the Web page from which that e-mail address was collected, and access that Web page (i.e., a link to the Web page is provided). A user can thereby quickly locate Web page information related to a particular collected e-mail address.

Additionally, the browser program 40 provides a user with the option to work "backwards" from a collected e-mail address to the "Home" page of the owner of the Web page from which the e-mail address was collected, rather than to the particular Web page from which the e-mail address was collected. This option may be useful to a user to conveniently obtain detailed information about a Web page owner for which an e-mail address is stored in the bookmark list 18 or in an Address Collection, as described below.

In another embodiment of the invention, each e-mail address in the address book 14 is stored in association with the Web page from which the e-mail address was collected, as well as in association with the entry in the bookmark list 18 in which the e-mail address is stored. A user may select a displayed e-mail address from the address book 14 to work "backwards" from the selected e-mail address to retrieve or access information related to the e-mail address. For example, a user may access the Web page from which the selected e-mail address was collected, the "home page" of the Web page owner, or the bookmark list entry associated with the selected e-mail address.

Figure 3:
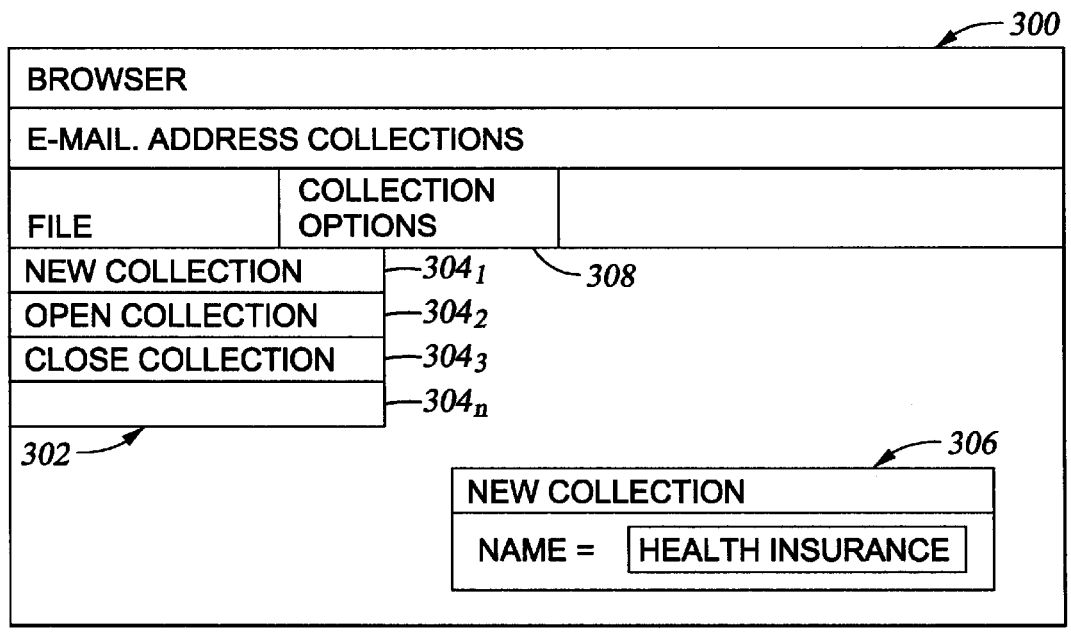
FIG. 3 depicts another graphical user interface for the browser of FIG. 1, displaying an e-mail Address Collections menu.

While collected e-mail addresses may be grouped according to the Web page from which they were collected, as illustrated in FIG. 2, they may also be grouped in an e-mail Address Collection. FIG. 3 depicts another graphical user interface 300 for the browser program 40 of FIG. 1, displaying an e-mail Address Collections menu 302.

An e-mail Address Collection (referred to herein as a "Collection") is a group of e-mail addresses collected by the browser program 40 in accordance with user instructions. For example, a user may want to have the browser program 40 collect e-mail addresses contained in all of the pages that a user visits, or accesses, during a particular Web browsing, or "surfing", session, during which a user may visit various Web pages. Using a Collection, e-mail addresses from the browsed Web pages are collected by the browser program and grouped not only in relation to the Web page from which they were collected, but also in relation to that particular Collection. A user may then later access the list of e-mails relating to that browsing session by retrieving the information associated with that particular Collection.

More particularly, FIG. 3 depicts a file menu 302 within an Address Collections display contained within the browser program 40. The e-mail address collections menu 302 allows a user to select options including a "New Collection" option $304_1$, an "Open Collection" option $304_2$, and a "Close Collection" option $304_3$. If a user chooses the "New Collection" option $304_1$, a New Collection window 306 appears. A user then enters a name for the Collection. For example, as shown in FIG. 3, a user has selected the "New Collection" option $304_1$ and entered the name "Health Insurance" into window 306, thereby making the Collection entitled "Health Insurance" active.

In one embodiment of the invention, a user may be provided with an option to have the browser program 40 select a default name for the Collection in the event the user chooses not to enter a name for the Collection. For example, the browser program 40 could store the name of the first Web page browsed while the Collection is active as the name of the Collection.

When a specific Collection is active, the browser program 40 collects e-mail addresses from Web pages accessed by a user, and the collected e-mail addresses are stored and grouped according to the Collection name. In one embodiment of the invention, an active Collection remains active until a user chooses to close the Collection, or until the browsing session ends.

In addition to the "New Collection" option $304_1$, a user may also select the "Open Collection" option $304_2$ or the "Close Collection" option $304_3$. The "Open Collection" option $304_2$ allows a user to make active an existing Collection, so that the browser program 40 collects additional e-mail addresses that are stored and grouped in relation to that Collection. The "Close Collection" option $304_3$ allows a user to make an active Collection inactive, so that collection of e-mail addresses relating to the Collection ceases. From the Address Collections display shown in FIG. 3, a user can also select the "Collection Options" menu 308, as described below.

Figure 4:
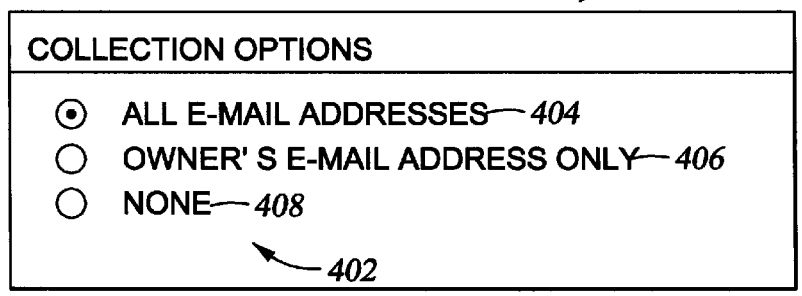
FIG. 4 depicts another graphical user interface for the browser of FIG. 1, displaying an e-mail Address Collection Options menu.

FIG. 4 depicts the graphical user interface 400 that is displayed when a user selects the "Collections Options" option 308. The Collection Options menu 402 allows a user to select the manner in which the browser program 40 collects e-mail addresses during the period of activity of an e-mail Address Collection. In addition, in one embodiment of the invention, the Collection Options menu 402 governs the manner of collection of e-mail addresses contained in a bookmark list.

When the "All e-mail Addresses" option 404 is selected, as shown in FIG. 4, the browser program 40 will collect all e-mail addresses contained in an accessed Web page. When the "Owner's e-mail Address Only" option 406 is selected, the browser program 40 will collect from an accessed Web page only the e-mail address tagged as the Web page owner's e-mail address, if one is present. Selecting the "None" option 408 causes the browser program 40 to cease collecting any e-mail addresses, except as described below.

In one embodiment of the invention, even though the "None" option 408 has been selected, the Collection remains active in that a user may select particular e-mail addresses contained within a browsed Web page, and the selected e-mail addresses will be added to the Collection. For example, in one embodiment a user highlights a particular e-mail address contained within a Web page and selects the e-mail address by clicking on the e-mail address using a mouse, and the e-mail address is added to the Collection. The browser program 40 may then provide the user with an option to have the browser program 40 select a descriptor for the selected e-mail address, or to have the user select particular text contained within the Web page to be stored as a descriptor for the selected e-mail address.

In one embodiment, the user may additionally be provided with an option to enter an e-mail address and associated descriptor of the user's choosing to be added to the Collection. In addition, the invention contemplates other user-defined collection parameters. For example, in one embodiment of the invention, a user may type a keyword or phrase such that the Browser program 40 will only collect e-mail addresses from Web pages containing that keyword or phrase. This and/or other collection parameters could be used in addition to the collection options described with reference to FIG. 4 above.

Figure 5:
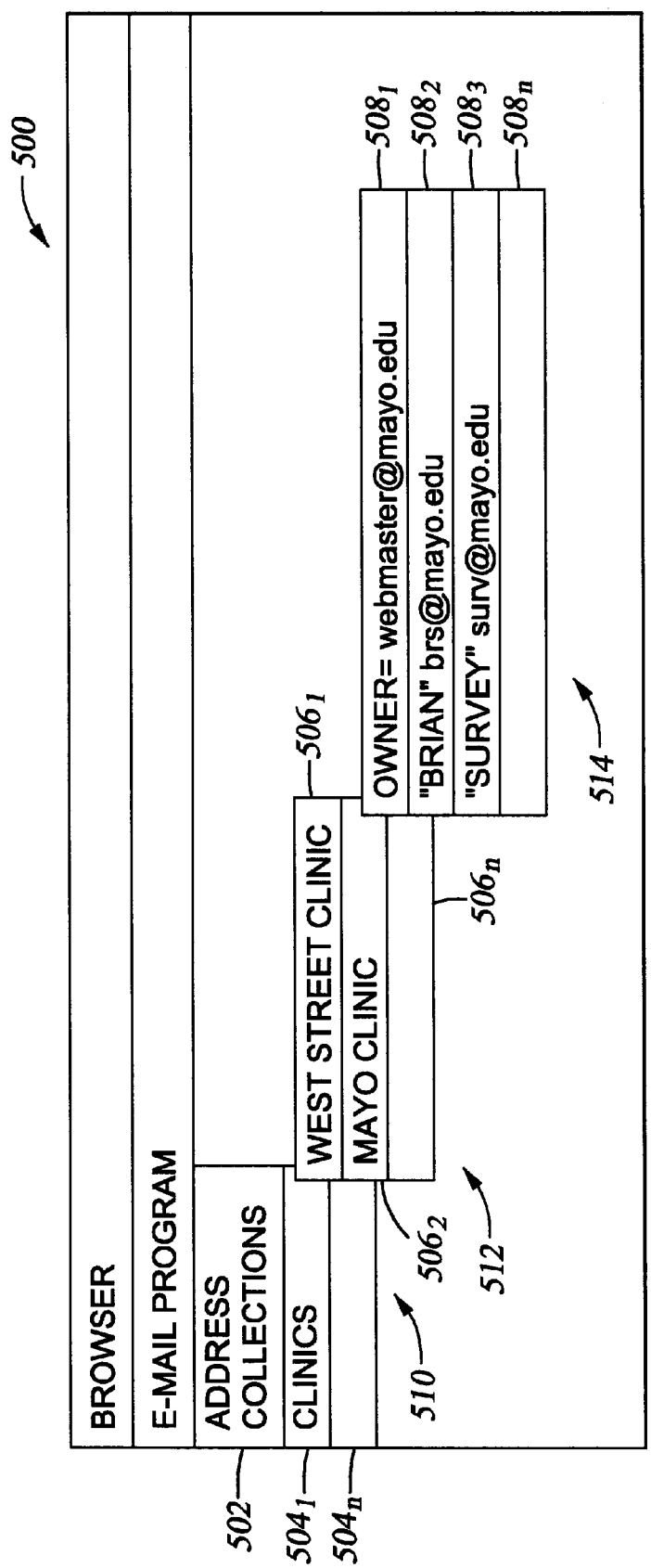
FIG. 5 depicts another graphical user interface for the browser of FIG. 1, displaying an e-mail Address Collections menu within an e-mail program of the browser.

FIG. 5 depicts another graphical user interface for the browser program 40 of FIG. 1, displaying an e-mail Address Collections menu 510 within the e-mail program 41 of the browser program 40. When a user chooses the "Address Collections" option 502, an Address Collections menu 510 appears, displaying the name of each existing Address Collection $504_1$–$504_n$. For a selected Address Collection, a Web page menu 512 appears displaying the titles $506_1$–$506_n$ of the Web pages visited while the selected Collection was active.

Finally in the menu hierarchy, for a selected Web page, an Address Collection email address menu 514 appears, displaying the collected e-mail addresses $508_1$–$508_n$ from the selected page, in a manner similar to that described with reference to FIG. 1. For example, as shown in FIG. 5, the Address Collection named "Clinics" $504_1$ has been selected, so that Web pages accessed while the Clinics Collection was active are displayed. Illustratively, the accessed web pages include the Web page entitled "West Street Clinic" $506_1$ and the Web page entitled "Mayo Clinic" $506_2$. Additionally, the Web page "Mayo Clinic" $506_2$ has been selected, so that e-mail addresses $508_1$–$508_n$ collected from that Web page are displayed.

In one embodiment, a user can then select one or more e-mail addresses $508_1$–$508_n$ from e-mail address menu 514 so that a blank e-mail message addressed to the selected e-mail address or addresses will be displayed. A user can then type and send an e-mail message to the selected e-mail address or addresses. Additionally, in one embodiment, a user may select an e-mail address or addresses from the address book 14 so that the user can type and send an e-mail message to the selected e-mail address or addresses.

Figure 6A:
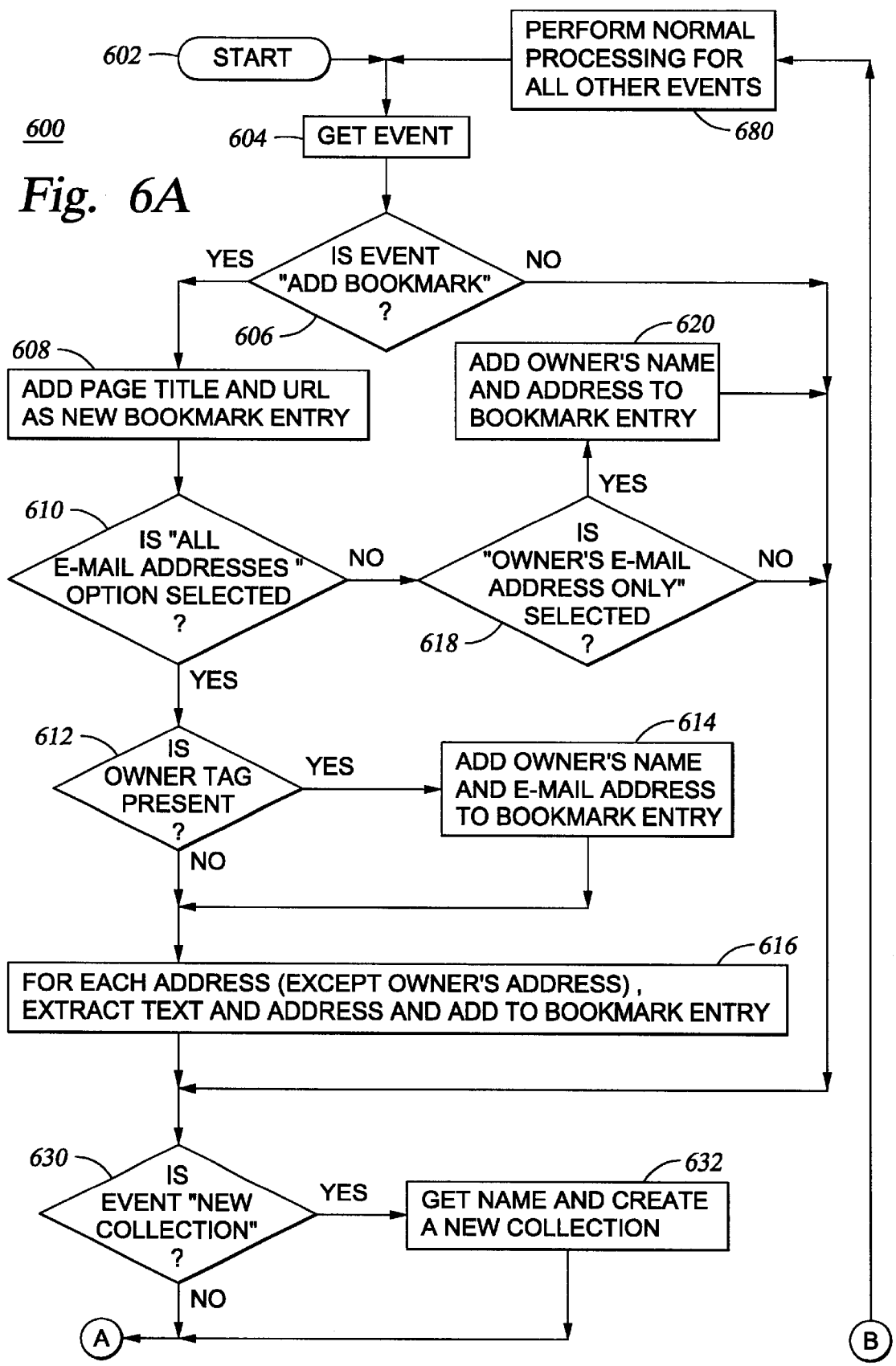
FIGS. 6A–B depicts a simplified flow diagram of a browser processing routine according to the present invention.
Figure 6B:
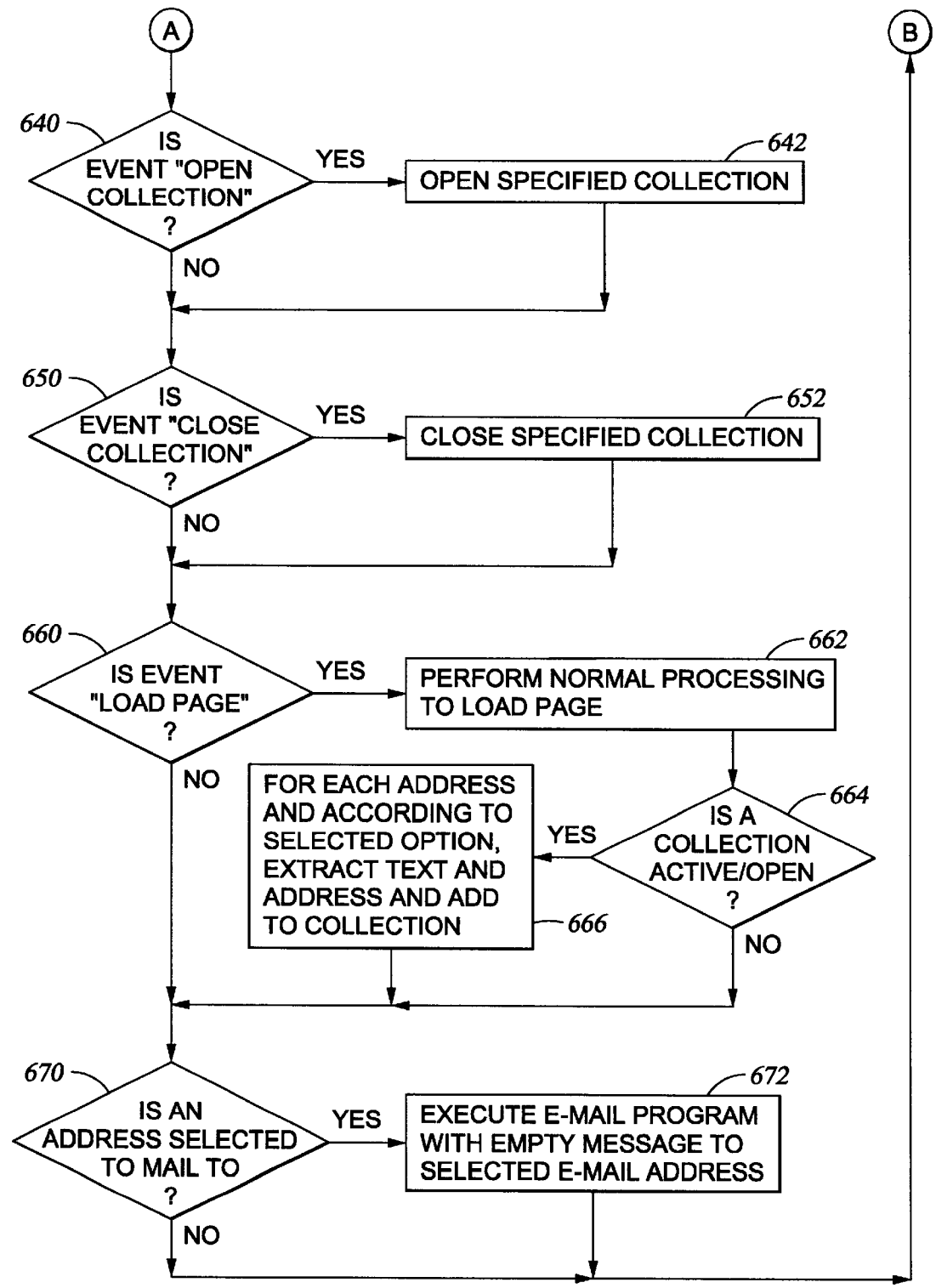

FIGS. 6A–B depicts a simplified flow diagram of a process that occurs as a user operates the browser program 40 on the client computer 22 in one embodiment of the invention. Entry into the processing routine 600 is depicted in step 602. During operation, a user initiates various actions (events) that are executed by the browser program 40 as represented by step 604. At step 606, the browser program 40 queries whether the event is the adding of a bookmark entry. If the event is not the adding of a bookmark entry to the bookmark list 18, then processing continues to step 630.

If, however, the event is the adding of a bookmark entry, then processing proceeds to step 608, at which the browser program 40 adds the Web page title and URL to the bookmark list 18 as a new entry. At step 610, the browser program 40 queries whether the "All e-mail Addresses" option 404 (FIG. 4) has been selected by a user. If not, then processing continues to step 618. At step 618, the browser program queries whether the "Owners e-mail Address Only" option 406 (FIG. 4) has been selected by a user. If not, then processing proceeds to step 630. If so, then processing proceeds to step 620, at which the Web page owner's e-mail address (if one exists) is collected and stored in table 50 (FIG. 1) in association with the Web page from which it has been collected. Processing proceeds to step 630.

If, however, the "All e-mail Addresses" option 404 has been selected by a user, then processing proceeds from step 610 to step 612. At step 612, the browser program 40 further queries whether an HTML tag identifying the owner (owner tag) is present in the bookmarked Web page. If an owner tag is present, processing proceeds to step 614, where the browser program 40 adds the Web page owner's name and e-mail address to the bookmark entry, storing this information in table 50 as such.

After step 614, and also if no owner tag is present, processing proceeds to step 616, at which each e-mail address contained in the Web page (except the owner's e-mail address, if present) as well as the text preceding the e-mail address is collected and stored in table 50 in association with the Web page. The Web page owner's e-mail address, if present, has already been stored at step 614. After step 616, processing proceeds to step 630.

At step 630, the browser program 40 queries whether the event is the creation of a new Collection (i.e. whether a user has selected the "New Collection" option $304_1$ of FIG. 3). If not, processing proceeds to step 640. If the event is a New Collection, at step 632, the browser program 40 obtains the name of the Collection from a user and makes the Collection active. Next, or if the event is not a new collection, processing proceeds to step 640.

At step 640, the browser program 40 queries whether the event is to open a Collection (i.e. whether a user has selected the "Open Collection" option $304_2$ of FIG. 3). If not, processing proceeds to step 650. If the event is to open a Collection, processing proceeds to step 642 at which the browser program 40 obtains the name of an existing Collection from a user and then opens the specified Collection, making that Collection active. Processing then proceeds to step 650.

At step 650, the browser program 40 queries whether the event is to close a Collection (i.e. whether a user has selected the "Close Collection" option $304_3$ of FIG. 3). If not, processing proceeds to step 660. If the event is to close a Collection, then at step 652, the browser program 40 obtains the name of an existing Collection from a user and then closes the specified Collection, making that Collection inactive. Processing then proceeds to step 660. In another embodiment of the invention, if only one Collection is active when a user chooses the "Close Collection" option 3043 of FIG. 3, then the browser program 40 makes the active Collection inactive without obtaining the name of a Collection.

At step 660, the browser program 40 queries whether the event is to load (i.e., render) a Web page. If not, processing proceeds to step 670. If, however, the event is to load a Web page, at step 662 the browser program 40 first performs normal processing to load the Web page, and then, at step 664, queries whether a Collection is active. If a Collection is active, the processing routine 600 proceeds to step 666, where each e-mail address and associated text present in the Web page is collected (according to the selected option, i.e., the "All e-mail Addresses" option 404, the "Owner's e-mail Address Only" option 406 or the "None" option 408). The collected information is then stored in table 50 in association with the active Collection, and the Web page from which the information has been collected. Processing according to the selected option at step 666 is similar to the processing sequence described with reference to steps 610–616, relating to adding e-mail addresses to a bookmark entry, and therefore shown in a simplified manner as step 666.

Next, or if the event at step 660 is not to load a Web page, the processing routine 600 proceeds to step 670 and queries whether an e-mail address has been selected by a user (e.g., so that the user can send an e-mail message to the selected e-mail address). If so, then processing proceeds to step 672 at which the browser program 40 executes the email program 41 (within the browser program 40) to display an empty e-mail message window addressed to the selected e-mail address(es). A user may then enter text or other data into the e-mail message window and then send the message via the network 26 (shown in FIG. 1).

Next, or if no address has been selected at step 670, the browser program 40 proceeds to step 680. At step 680, the browser program 40 performs normal processing for all other events (i.e. all events other than those depicted at steps 606, 630, 640, 650, 660, and 670). The processing routine 600 then returns to step 604, where the browser program 40 obtains another event.

While the foregoing is directed to the preferred embodiment of the present invention, other and further embodiments of the invention may be devised without departing from the basic scope thereof, and the scope thereof is determined by the claims that follow.

What is claimed is:

1. A method for collecting electronic mail addresses, comprising:
   executing a browser program to access an electronic document having a network address and containing at least one electronic mail address;
   parsing the electronic document to identify the at least one electronic mail address; and
   storing the network address and the at least one electronic mail address in association with the network address in a bookmark list;
   wherein a descriptor associated with the at least one electronic mail address is collected from the electronic document and stored in association with the at least one electronic mail address.

2. The method of claim 1, wherein the at least one electronic mail address is stored in a data structure located in a computer executing the browser program.

3. The method of claim 1, wherein the browser program is executed from a client computer connected via a network to a server computer containing the electronic document.

4. The method of claim 3, wherein the network comprises the Internet.

5. The method of claim 1, wherein the network address is a Uniform Resource Locator (URL) and the electronic document is a Hypertext Markup Language (HTML) document.

6. The method of claim 1, wherein the at least one electronic mail address Is stored as a subcategory of the network address in the bookmark list.

7. The method of claim 1, further comprising providing a user of the browser program with an option to access the electronic document through accessing the stored at least one electronic mail address associated with the network address of the electronic document.

8. The method of claim 1, further comprising providing a user of the browser program with an option to cause the browser program to collect electronic mail addresses from at least one linked electronic document pointed to by pointers contained in the electronic document.

9. The method of claim 1, further comprising providing a user of the browser program with an option to send an electronic mall message to the at least one electronic mail address.

10. The method of claim 1, further comprising providing a user of the browser program with an option to send an electronic mail message to an owner of the electronic document.

11. The method of claim 1, further comprising providing a user of the browser program with an option to access a Home page of an owner of the electronic document.

12. The method of claim 1, wherein the step of storing further comprising storing the at least one electronic mail address in an address book, and wherein the at least one electronic mail address is stored in the address book in association with the network address.

13. The method of claim 12, further comprising providing a user of the browser program with an option to access a bookmark entry associated with the at least one electronic mail address.

14. The method of claim 1, wherein the descriptor is identified by HTML tags contained within the electronic document.

15. The method of claim 1, wherein the at least one electronic mail address comprises a plurality of electronic mail addresses and wherein the step of storing comprises storing selected ones of the plurality of electronic mail addresses according to one or more user-provided parameters.

16. The method of claim 15, wherein the one or more user-provided parameters comprise at least one of a keyword and a time condition.

17. A computer-readable medium having instructions which, when executed by a processor, cause the processor to perform a method, comprising:
    executing a browser program to access an electronic document having a network address and containing at least one electronic mail address;
    parsing the electronic document to identify the at least one electronic mail address; and
    storing the network address and the at least one electronic mail address in association with the network address in a bookmark list;
    wherein a descriptor associated with the at least one electronic mail address is collected from the electronic document and stored in association with the at least one electronic mail address.

18. The computer-readable medium of claim 17, wherein the at least one electronic mail address is stored in a data structure located in a computer executing the browser program.

19. The computer-readable medium of claim 17, wherein the browser program is executed from a client computer connected via a network to a server computer containing the electronic document.

20. The computer-readable medium of claim 19, wherein the network comprises the Internet.

21. The computer-readable medium of claim 17, wherein the network address is a Uniform Resource Locator (URL) and the electronic document is a Hypertext Markup Language (HTML) document.

22. The computer-readable medium of claim 17, wherein the at least one electronic mail address is stored as a subcategory of the network address in the bookmark list.

23. The computer-readable medium of claim 17, further comprising providing a user of the browser program with an option to access the electronic document through accessing the stored at least one electronic mail address associated with the network address of the electronic document.

24. The computer-readable medium of claim 17, further comprising providing a user of the browser program with an option to cause the browser program to collect electronic mail addresses from at least one linked electronic document pointed to by pointers contained in the electronic document.

25. The computer-readable medium of claim 17, further comprising providing a user of the browser program with an option to send an electronic mail message to the at least one electronic mail address.

26. The computer-readable medium of claim 17, further comprising providing a user of the browser program with an option to send an electronic mail message to an owner of the electronic document.

27. The computer-readable medium of claim 17, further comprising providing a user of the browser program with an option to access a Home page of an owner of the electronic document.

28. The computer-readable medium of claim 17, wherein the step of storing further comprising storing the at least one electronic mail address in an address book, and wherein the at least one electronic mail address is stored in the address book in association with the network address.

29. The computer-readable medium of claim 28, further comprising providing a user of the browser program with an option to access a bookmark entry associated with the at least one electronic mail address.

30. The computer-readable medium of claim 17, wherein the descriptor is identified by HTML tags contained within the electronic document.

31. The computer-readable medium of claim 17, wherein the at least one electronic mail address comprises a plurality of electronic mail addresses and wherein the step of storing comprises storing selected ones of the plurality of electronic mail addresses according to one or more user-provided parameters.

32. The computer-readable medium of claim 31, wherein the one or more user-provided parameters comprise at least one of a keyword and a time condition.

33. An apparatus for collecting at least one electronic mail address from at least one electronic document located on a network at a network address, comprising:
    a memory containing a browser program;
    a processor configured to execute the browser program;
    wherein the browser program, when executed by the processor, performs a method comprising:
        accessing the at least one electronic document;
        parsing the electronic document to identify the at least one electronic mail address, and
        storing the network address and the at least one electronic mail address in association with the network address in a bookmark list;
        wherein a descriptor associated with the at least one electronic mail address is collected from the electronic document and stored in association with the at least one electronic mail address.

34. The apparatus of claim 33, wherein the at least one electronic mail address is stored in a data structure located in a computer executing the browser program.

35. The apparatus of claim 33, wherein the browser program is executed from a client computer connected via a network to a server computer containing the electronic document.

36. The apparatus of claim 35, wherein the network comprises the Internet.

37. The apparatus of claim 33, wherein the network address is a Uniform Resource Locator (URL) and the electronic document is a Hypertext Markup Language (HTML) document.

38. The apparatus of claim 33, wherein the at least one electronic mail address is stored as a subcategory of the network address in the bookmark list.

39. The apparatus of claim 33, further comprising providing a user of the browser program with an option to access the electronic document through accessing the stored at least one electronic mail address associated with the network address of the electronic document.

40. The apparatus of claim 33, further comprising providing a user of the browser program with an option to cause the browser program to collect electronic mail addresses from at least one linked electronic document pointed to by pointers contained in the electronic document.

41. The apparatus of claim 33, further comprising providing a user of the browser program with an option to send an electronic mail message to the at least one electronic mail address.

42. The apparatus of claim 33, further comprising providing a user of the browser program with an option to send an electronic mail message to an owner of the electronic document.

43. The apparatus of claim 33, further comprising providing a user of the browser program with an option to access a Home page of an owner of the electronic document.

44. The apparatus of claim 33, wherein the step of storing further comprising storing the at least one electronic mail address in an address book, and wherein the at least one electronic mail address is stored in the address book in association with the network address.

45. The apparatus of claim 44, further comprising providing a user of the browser program with an option to access a bookmark entry associated with the at least one electronic mail address.

46. The apparatus of claim 33, wherein the descriptor is identified by HTML tags contained within the electronic document.

47. The apparatus of claim 33, wherein the at least one electronic mail address comprises a plurality of electronic mail addresses and wherein the step of storing comprises storing selected ones of the plurality of electronic mail addresses according to one or more user-provided parameters.

48. The apparatus of claim 47, wherein the one or more user-provided parameters comprise at least one of a keyword and a time condition.

* * * * *